Patented Apr. 3, 1951

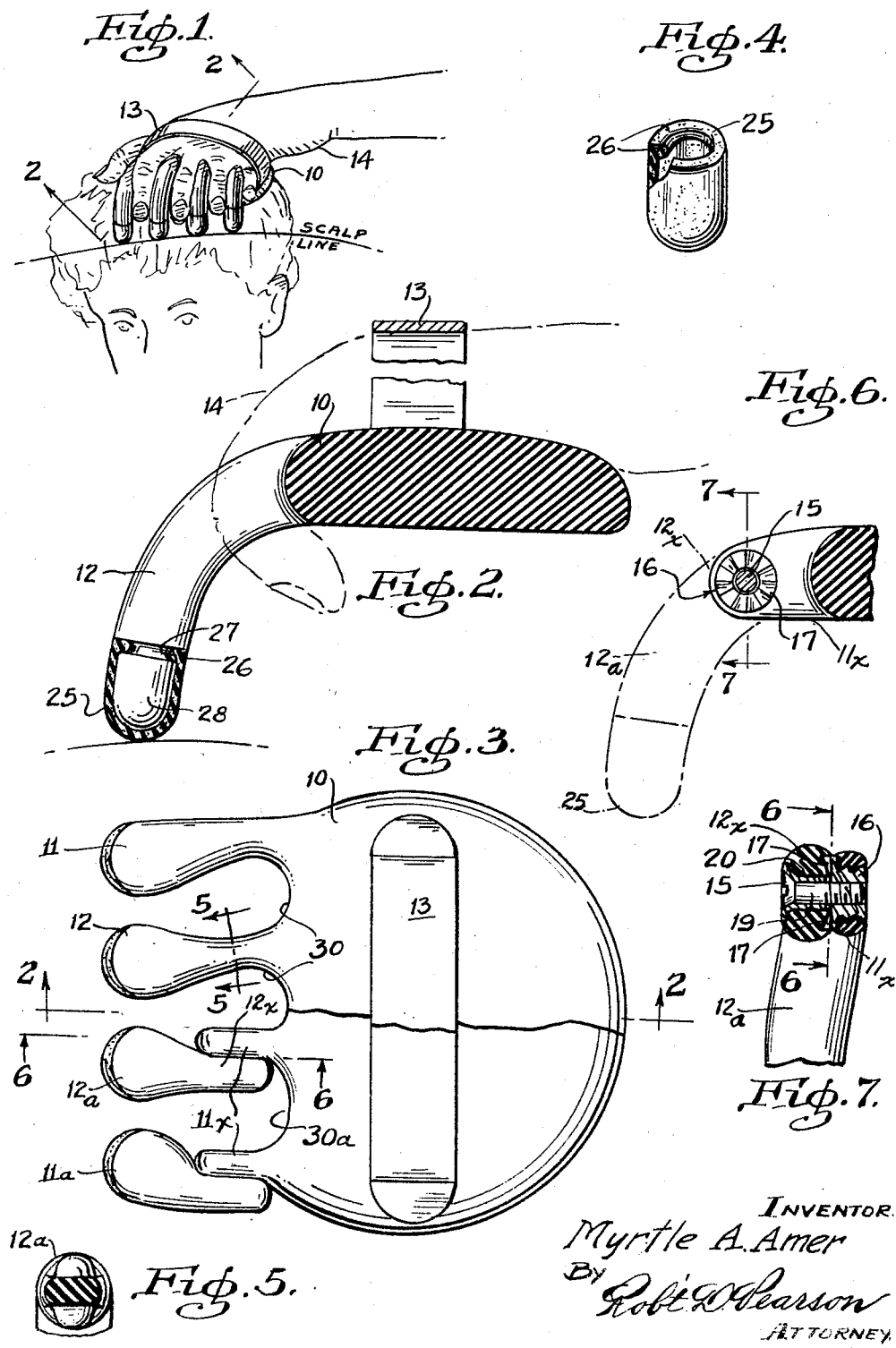

2,547,243

UNITED STATES PATENT OFFICE 2,547,243

MASSAGING IMPLEMENT

Myrtle A. Amer, Hollywood, Calif.

Application October 22, 1948, Serial No. 55,991

4 Claims. (Cl. 128—67)

This invention relates to a manually operable massaging implement.

More specifically speaking the invention pertains to a massaging implement comprising a flattened, more or less circular body having a plurality of massaging fingers extending laterally from a segmental portion of its periphery, said body being particularly well adapted to be grasped by a hand of the operator while he performs the massaging operation with his hand in an overlying relation thereto.

Accordingly, among the objects of the invention are to provide a massaging implement contoured in an improved manner with a view to being more conveniently and securely grasped during use by the hand of the operator; to provide a massaging implement furnished with massaging fingers which, in certain respects will more closely simulate the action, upon the flesh of the patient, of the fingers of the hand of a masseuse; and, as a subordinate feature of the invention, to provide for a mechanical massaging finger an adjustable joint structure that will make it possible to adjust each artificial finger of the implement in a variety of different positions with a view to performing more efficiently the different kinds of massage for which the implement may be used.

Also, a more specific object of the invention is to provide a scalp massaging device wherein the pressure surfaces of the finger portions of the device are so shaped and so restricted in area that they will have a greater tendency to flatten the individual hairs, thus making it easier to curl them. By the use of this device "permanent waves" are rendered unnecessary.

Other objects, advantages and features of invention will hereinafter appear.

Referring to the accompanying drawing, which illustrates a preferred embodiment of the invention, Fig. 1 is a perspective view of the implement showing the same attached to a hand of the masseuse and being used to massage a human head.

Fig. 2 is a sectional view showing the implement, per se, on an enlarged scale, the plane of section being indicated by line 2—2 on Fig. 1.

Fig. 3 is a plan view of the implement showing it on the same scale as that of Fig. 2. Two of the fingers shown in this view illustrate a modification.

Fig. 4 is a perspective view of one of the removable, artificial finger tips of the device, a fragment being broken out in order to show more clearly the structure thereof.

Fig. 5 is a cross-section of one of the two inner fingers, on line 5—5 of Fig. 3.

Fig. 6 is a fragmental cross-section on line 6—6 of Figs. 3 and 7. The distal finger section shown in phantom lines is on the near side of the plane of section.

Fig. 7 is a fragmentary cross-section of one of the artificial fingers of the implement, on line 7—7 of Fig. 6.

Referring in detail to the drawing, the main parts of the device shown are the flattened, circular body 10, desirably made of hard rubber or of other similar material, the plurality of artificial massaging fingers 11 and 12 (four being shown by way of example), and the strap 13 whereby the implement is securable to the hand 14 of the masseuse.

It is desirable that the fingers of the device be substantially parallel to each other and that their tips substantially aline with each other; therefore the outer fingers 11, 11a of the four shown are made somewhat longer than the two intermediate fingers 12, 12a, the fingers of the set being thus proportioned to compensate for the curvature of the peripheral segment which they occupy along the edge of the flattened body 10.

The fingers 11a and 12a pertain to a modification, illustrated in section in Figs. 6 and 7. In this modification the finger 11a may be termed a distal finger joint or section, it being carried by a shorter proximal finger section 11x; and the finger section 12a may be termed a distal finger section carried by a proximal section 12x. The joint structure shown in Figs. 6 and 7 answers for both these finger structures. Said joint structure comprises a countersunk, flat headed clamping screw 15 which cooperates with a clamping nut 16 having a radially serrated face 17. Said serrated face, when the nut is screwed down, bites into the semi-hard flattened surface of the adjacent part of the distal finger section 11a (or 12a). The screw 15 has a smooth outer end portion 19 which turns freely in a bore 20 provided for it in the swingably adjustable part of the finger. It is obvious that when the device is made with swingable fingers they should all be adjustable to the same angle so that their tips will make proper contact with the patient's body during massage.

In Figs. 4 and 5 a removable, elastic finger tip 25 is shown having its inner end portion provided with an internal, annular lip 26 which assists in holding in place the applied fingertip, said lip 26 seating in a groove 27 which surrounds each finger. Beyond said groove each finger has a diametrically reduced tip portion 28, so that fingers of a uniform diameter result after the application of said finger tips.

The widened spaces 30, 30a between the proximal or inner end portions of the adjacent artificial fingers provide ample room for the fingers of the operator, enabling him to obtain a more secure hold upon the device while the palm of his hand overlies the upper surface thereof. Said widened spaces 30 result from the proximal portions of the fingers being, as viewed in plan, narrowed in relation to their distal portions, this being done in such a manner as to provide an oval space between adjacent fingers, the individual fingers of the operator's hand comfortably fitting into the rounded spaces thus provided. When the body and finger portions of the device are formed in one piece, as shown in Fig. 2 and in the upper half of Fig. 3, a very sturdy, durable implement results. In both forms of the invention, during the operation of the device, the finger portions thereof are maintained in a fixed relation to its body portion.

Massaging the scalp with this device stimulates the roots of the hair, brings an additional supply of blood to the scalp, and tends to produce and maintain a healthy condition of the scalp and hair.

I claim:

1. A massaging implement comprising a flattened approximately circular body, a series of proximal finger elements extending radially out from the edge portion of a segment of said body, said finger elements having between them, adjacent to their inner ends, spaces to admit the fingers of the operator, a like number of distal artificial finger elements each united by an adjustable joint structure to the outer end of its proximal finger element by a hinge joint, and means for securing said joint structures against flexion in adjusted positions with the aforesaid sections of each artificial finger adjusted in the desired angular relation to each other.

2. A massaging implement comprising a flattened approximately circular body, a series of proximal finger elements extending radially out from the edge portion of a segment of said body, said finger elements having between them, adjacent to their inner ends, spaces to admit the fingers of the operator, a like number of distal artificial finger elements each united by an adjustable joint structure to the outer end of its proximal finger element by a hinge joint, and means for securing said joint structures in adjusted positions with the aforesaid sections of each artificial finger held against flexion in the desired angular relation to each other, each of said finger joints including overlapping ends at the joint, a clamping screw extending through said overlapping ends, and a clamping nut cooperating with said screw.

3. The subject matter of claim 2, and said clamping nut having a radially serrated face, which face is engageable with a semi-hard portion of the distal finger section.

4. A massaging implement comprising a flattened, approximately circular body having a plurality of massaging fingers extending laterally from a segment of the circular body, adjacent fingers of said plurality being sufficiently spaced apart where they join said body to admit between them a finger of the operator when the palm portion of his hand is in an overlying relation to said body, said fingers of the implement being maintained in a fixed relation to said body during the operation of the implement, each of said massaging fingers consisting of a short proximal section and a long distal section, and means adjustably securing said finger sections to each other in each massaging finger so that they may be fixedly adjusted in varying degrees of flexion.

MYRTLE A. AMER.

REFERENCES CITED

The following references are of record in the file of this patent:

UNITED STATES PATENTS

| Number | Name | Date |
| --- | --- | --- |
| 1,595,203 | Leathers | Aug. 10, 1926 |
| 1,623,124 | Laufe | Apr. 5, 1927 |
| 2,427,610 | Konig | Sept. 16, 1947 |